US006244071B1

(12) United States Patent
Gary et al.

(10) Patent No.: US 6,244,071 B1
(45) Date of Patent: Jun. 12, 2001

(54) PROCESS FOR PURIFYING A CRYOGENIC FLUID CONTAINING $N_2O$, $C_NH_M$ AND/OR $NO_X$ IMPURITIES

(75) Inventors: Daniel Gary, Montigny le Bretonneux; Serge Moreau, Velizy-Villacoublay; Dominique Fournis, St-Remy-les-Chevreuse, all of (FR)

(73) Assignee: L'Air Liquide Societe Anonyme pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/421,225

(22) Filed: Oct. 20, 1999

(30) Foreign Application Priority Data

Oct. 20, 1998 (FR) .................................................. 98 13138

(51) Int. Cl.[7] ........................................................ F25J 3/08
(52) U.S. Cl. ............................................................... 62/642
(58) Field of Search ........................... 62/636, 642, 908; 95/128, 148

(56) References Cited

U.S. PATENT DOCUMENTS

| 3,011,589 | * | 12/1961 | Meyer | ................................ 183/114.2 |
| 5,106,399 | * | 4/1992 | Fisher | ........................................ 62/22 |
| 5,425,240 | * | 6/1995 | Jain et al. | ................................. 62/18 |
| 5,706,674 | * | 1/1998 | Hsiung et al. | .......................... 62/632 |

* cited by examiner

Primary Examiner—William Doerrler
Assistant Examiner—Malik N. Drake
(74) Attorney, Agent, or Firm—Young & Thompson

(57) ABSTRACT

A process for purifying a cryogenic fluid, especially argon, helium or oxygen, containing $N_2O$, $C_nH_m$ or $NO_x$ impurities, in which the impurities are removed by bringing the cryogenic fluid to be purified into contact with particles of an adsorbent having an average size of less than or equal to 1.5 mm, preferably from 0.8 mm to 1.1 mm. A purified cryogenic fluid is then recovered which contains less than 100 ppb of impurities, preferably less than 10 ppb of impurities. This process can be used for producing ultrapure gases intended especially for the electronics field.

17 Claims, 3 Drawing Sheets

PROCESS FOR PURIFYING A CRYOGENIC FLUID CONTAINING $N_2O$, $C_NH_M$ AND/OR $NO_X$ IMPURITIES

FIELD OF THE INVENTION

The present invention relates to a process for purifying a cryogenic fluid, such a nitrogen, oxygen, helium, hydrogen or argon, or in particular its $NO_2O$, $C_nH_m$ and/or $NO_x$ impurities.

BACKGROUND OF THE INVENTION

Cryogenic fluids such as oxygen, nitrogen, helium, hydrogen or argon are of great industrial importance, especially in the electronics field.

Thus, it is common practice to use nitrogen for inerting or cooling printed circuits during their manufacturing process and helium is often employed for cooling hot optical fibres.

At the present time, the various cryogenic fluids are obtained by cryogenic distillation from ambient air or from gas mixtures containing them or by non-cryogenic separation techniques, for example by pressure swing adsorption processes, usually called PSA processes, or by membrane permeation.

However, for some applications, especially in the electronics field, the cryogenic fluid must be of high purity, that is to say it must contain minimal amounts of impurities and other undesirable contaminants, in order to prevent these impurities from causing undesirable physico-chemical reactions or reactions incompatible with the intended aim.

Thus, it is usual to purify the cryogenic fluids very thoroughly, that is to say down to impurity levels of less than a few tens of ppb (parts per billion) or even to 1 ppb.

Up to the present time, many methods of purifying cryogenic fluids have already been proposed.

Thus, mention may be made of document EP A-662,595 which describes a process for preparing high-purity liquid nitrogen, in which process the carbon monoxide, oxygen and hydrogen impurities present in the liquid nitrogen are removed by adsorption on a zeolitic material or a material of the porous metal oxide type.

Furthermore, document U.S. Pat. No. 4,746,332 describes the removal of carbon monoxide present in liquid nitrogen by adsorption on a type 5A zeolite.

Moreover, EP-A-590,946 teaches prepurification, using a TSA (Temperature Swing Adsorption) type process, of carbon monoxide present in gaseous nitrogen at a temperature of 90 K. to 150 K., followed by ultrapurification by subsequent distillation of the nitrogen thus prepurified.

Document EP-A-750,933, for its part, relates to removal of carbon monoxide and oxygen which are present in liquid or gaseous nitrogen or argon by adsorption on a transition metal oxide or oxides, for example a hopcalite.

Moreover, document U.S. Pat. No. 4,717,406 teaches the purification of a stream by mechanical filtration and adsorption on an adsorbent, especially of the molecular-sieve, activated-charcoal or silica type.

Document WO-A-98/28226 recommends purifying a cryogenic fluid, such as helium, hydrogen or argon, of its impurities by mechanical filtration of the impurities in the form of crystals and adsorption of the impurities in dissolved or gaseous form, so as to obtain a purified fluid containing less than 1 ppb of impurities.

Furthermore document U.S. Pat. No. 4,425,143 describes a zeolite having enhanced adsorption performance and being characterized by a high Si/Al ratio in order to withstand acids, this zeolite being free of $Fe_2O_3$.

Document EP-A-747,118 teaches the removal of oxygen impurities from an inert gas by means of a support impregnated with an alkali or alkaline-earth metal oxide.

Finally, document U.S. Pat. No. 3,597,169 relates to a process for removing methane impurities contained in liquid oxygen by employing a zeolite X highly exchanged with calcium or silver cations.

In practice, the adsorbent particles used in these various processes usually have an average size of about 2 mm to 5 mm.

However, although these processes allow certain impurities contained in the cryogenic fluids, especially such as carbon monoxide, carbon dioxide or oxygen impurities, to be removed relatively well, it appears that the problem of effective removal of certain other impurities likely to be present in relatively large amounts in cryogenic fluids have not been solved hitherto, or have only been solved incompletely.

SUMMARY OF THE INVENTION

The object of the present invention is therefore to improve the existing processes by proposing a cryogenic-fluid purification process allowing effective removal of, in particular, $N_2O$, $C_nH_m$ and/or $NO_x$ impurities liable to be present in a cryogenic fluid, such as nitrogen, oxygen, helium, hydrogen or argon.

Within the context of the present invention, $NO_x$ should be understood to mean NO and/or $NO_2$ and $C_nH_m$ should be understood to mean one or more hydrocarbons, such as molecules with a saturated or unsaturated carbon backbone.

The present invention therefore relates to a process for purifying a cryogenic fluid containing impurities chosen from $N_2O$, $C_nH_m$ (hydrocarbons) and $NO_x$, in which process:

(a) at least some of the impurities contained in the cryogenic fluid to be purified are removed by bringing the cryogenic fluid to be purified into contact with particles of at least one adsorbent, the particles having an average size of less than or equal to 1.5 mm; and (b) a purified cryogenic fluid is recovered which contains less than 100 ppb of the impurities, preferably less than 10 ppb of the impurities.

The reason for this is that the inventors of the present invention have demonstrated that the size of the adsorbent particles has a great influence on the performance, that is to say the effectiveness, of the purification process.

As shown in the examples below, it appears that a beneficial effect on the performance of the process may be obtained by reducing the size of the adsorbent particles used in the purification process, this probably being due to the improvement in the kinetics of impurity adsorption on the adsorbent.

Depending on the case, the process according to the invention comprises one or more of the following characteristics:

- the particles have an average size of less than or equal to 1.4 mm, preferably less than or equal to 1.3 mm, preferably less than or equal to 1.2 mm and advantageously approximately 0.8 mm to 1.1 mm;
- the cryogenic fluid is chosen from among oxygen, argon, nitrogen, hydrogen and helium;
- the cryogenic fluid is in the liquid and/or gaseous state;
- at least some of the impurities contained in the cryogenic fluid to be purified are removed by adsorption or by chemisorption on the adsorbent particles;

the removal of the impurities is carried out at a temperature below approximately −120° C., preferably below −150° C.;

the removal of the impurities is carried out at a pressure of $10^5$ Pa to $3 \times 10^6$ Pa;

the contact time between cryogenic fluid and adsorbent particles is less than or equal to 300 s, preferably from 70 to 200 s;

the adsorbent particles have a pore diameter of 0.5 to 2.5 mm and/or a pore volume of 0.2 to 0.8 ml/g and/or a specific surface area of 100 to 1500 $m^2/g$, preferably from 600 to 850 $m^2/g$;

the adsorbent particles are in bead, extruded, crushed or elliptical form;

the adsorbent particles are made of a material chosen from among silica gel, zeolites, metal oxides, such as hopcalite, and carbon materials;

a purified cryogenic fluid is recovered which contains at most 1 ppb of impurities;

the process is of the PSA (Pressure Swing Adsorption) of TSA (Temperature Swing Adsorption), preferably TSA, type;

the cryogenic fluid possibly contains one or more impurities chosen from the group formed by $H_2$, CO, $CO_2$ and $H_2O$, which are also removed;

the adsorbent is of the zeolite type, especially an X, LSX (for Low Silica X) or A zeolite, which is unexchanged or exchanged with metal cations, particularly calcium, silver, copper, cobalt, nickel, palladium or platinum cations.

BRIEF DESCRIPTION OF THE DRAWINGS

The invention will now be described in greater detail with the aid of examples and of the appended figures, these being given by way of illustration but implying no limitation.

EXAMPLES

The following tests aim to demonstrate the effectiveness of the adsorption purification process according to the present invention.

More specifically, in these various tests, the conditions for carrying out the purification process are as follows:

| | |
|---|---|
| fluid to be purified: | liquid argon |
| impurities to be removed: | $N_2O$ |
| content of $N_2O$ impurities (as input): | 1 to 8.5 ppm |
| purification temperature: | −185° C. |
| purification pressure: | $8 \times 10^5$ Pa |
| contact time: | 70 to 200 seconds |
| purification throughput: | approximately 1 $Sm^3/h$. |

Furthermore, the adsorbent employed has the following characteristics:

| | |
|---|---|
| nature of the adsorbent: | silica gel |
| shape of the particles: | spheres |
| average particle sizes: | 1.1, 2 or 2.5 mm |
| average pore volume: | approximately 0.40 ml/g |
| average pore diameter: | 2 nm |
| specific surface area: | 750 $m^2$g. |

Test No. 1: Purification of liquid argon on 2.5 particles

The stream of liquid argon to be purified, which contains 8.5 ppm of $N_2O$ impurities, is brought into contact with adsorbent particles having an average size of 2.5 mm.

In this test, the contact time is approximately 130 seconds.

Figure 1:
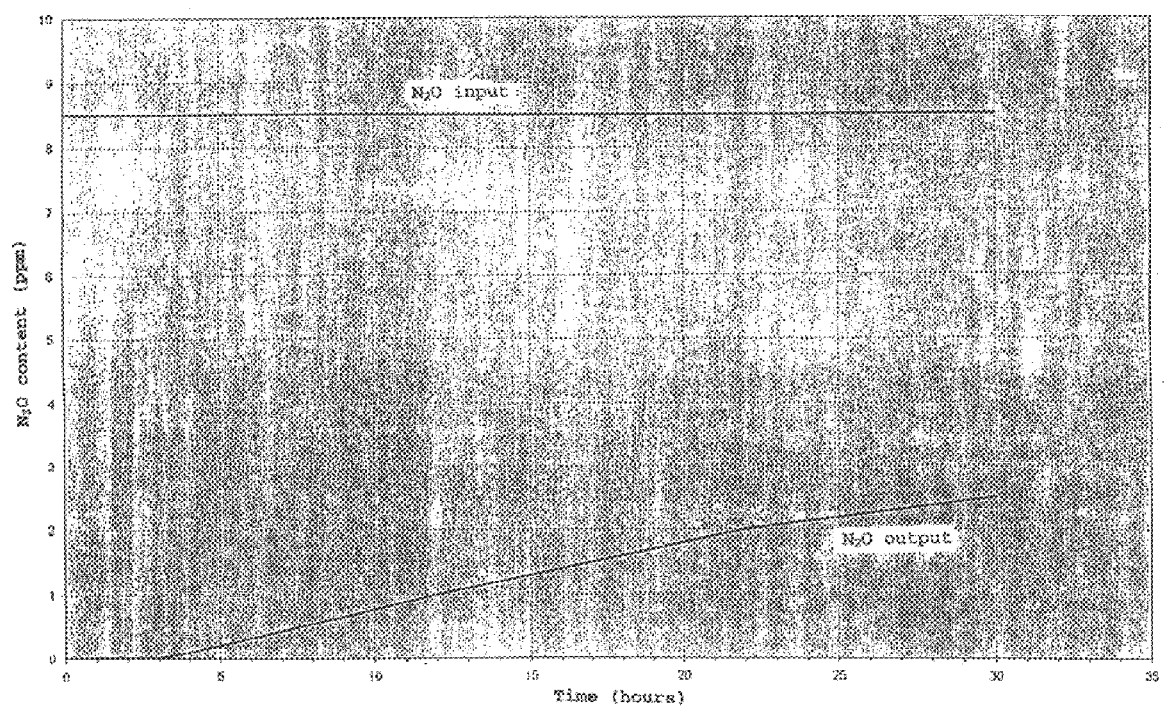
FIG. 1 is a graphical representation of the amount of $N_2O$ adsorbed as a function of time using silica gel particles having an average particle size of 2.5 mm as an adsorbent.

The results obtained are plotted in FIG. 1 and clearly show that the $N_2O$ break-through occurs after only 4 hours on 2.5 mm particles.

The break-through stopping capacity is therefore 0.9 Scc/g.

Test No. 2: Purification of liquid argon on 2 mm particles

The stream of liquid argon to be purified, which contains 1 ppm of $N_2O$ impurities, is brought into contact with adsorbent particles having an average size of 2 mm.

In this test, the contact time is approximately 200 seconds.

Figure 2:
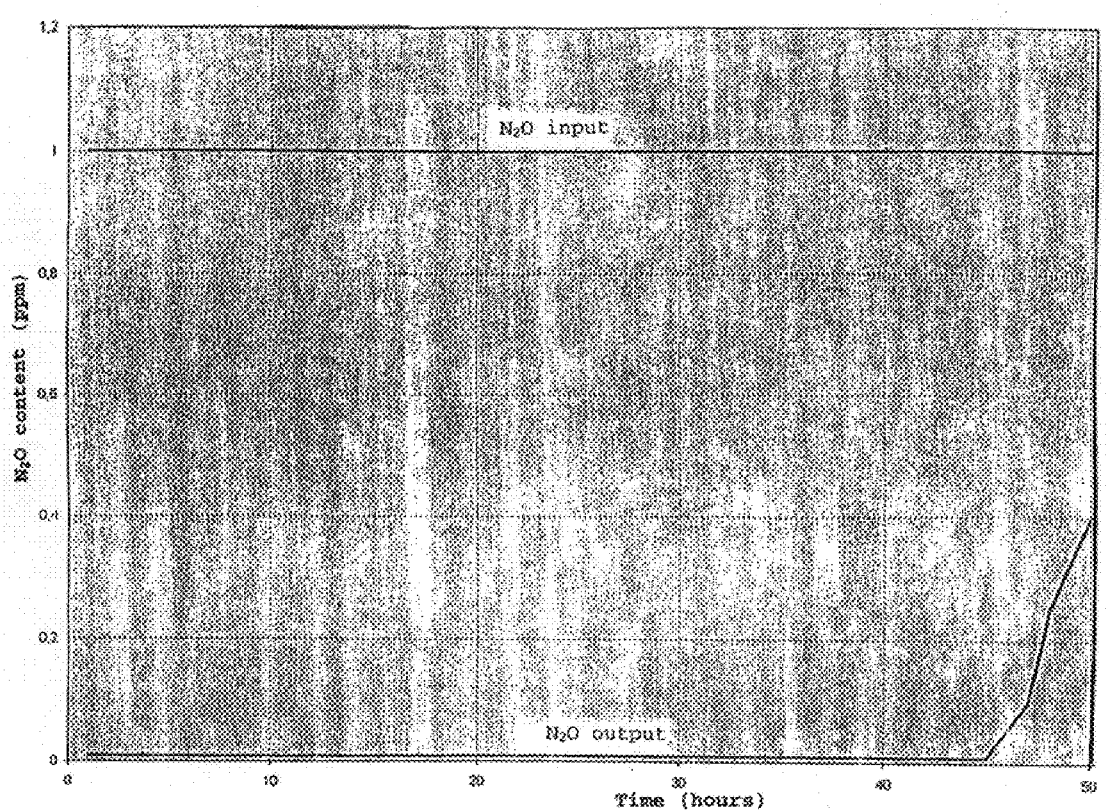
FIG. 2 is a graphical representation of the amount of $N_2O$ adsorbed as a function of time using silica gel particles having an average particle size of 2.0 mm as an adsorbent.

The results obtained are plotted in FIG. 2 and clearly show that the $N_2O$ break-through occurs after 47 hours on the 2 mm particles.

The break-through stopping capacity is therefore 0.85 Scc/g.

Test No. 3: Purification of liquid argon on 1.1 mm particles

The stream of liquid argon to be purified, which contains 1.5 ppm of $N_2O$ impurities, is brought into contact with adsorbent particles having an average size of 1.1 mm.

In this test, the contact time is approximately 70 seconds.

Figure 3:
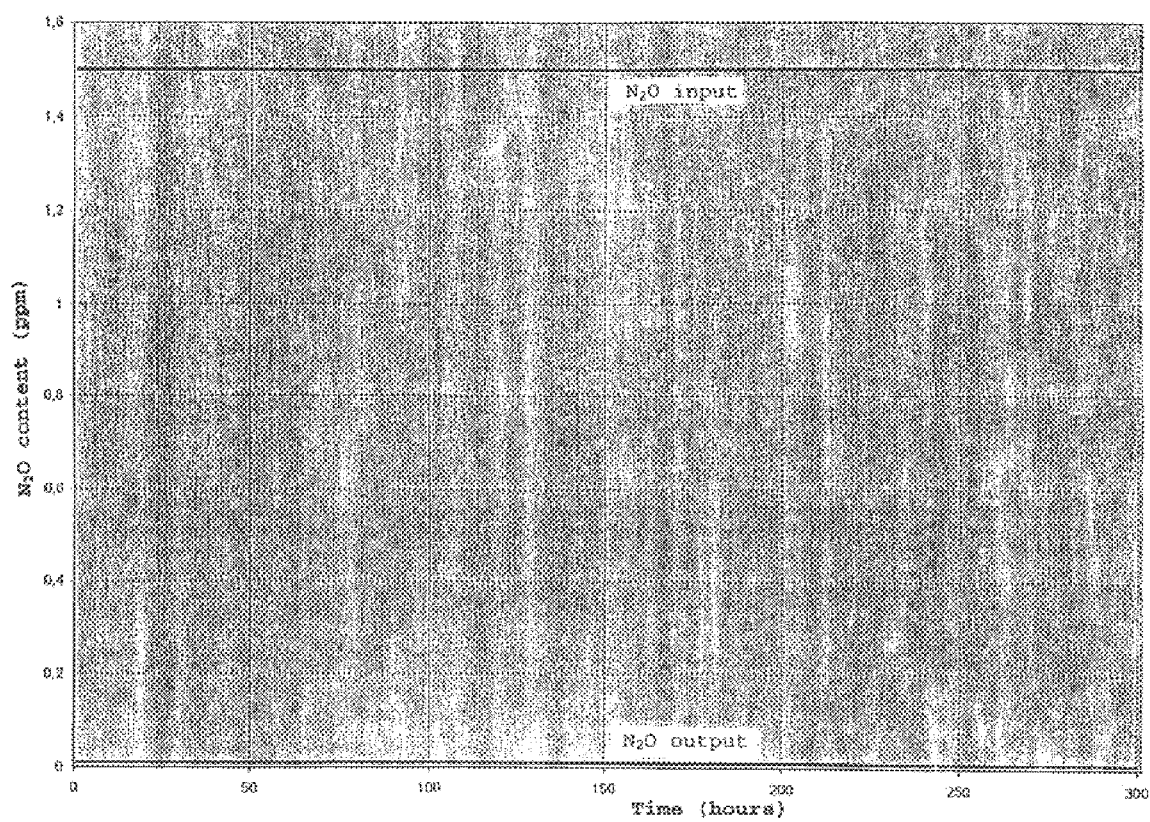
FIG. 3 is a graphical representation of the amount of $N_2O$ adsorbed as a function of time using silica gel particles having an average particle size of 1.1 mm as an adsorbent.

The results obtained are plotted in FIG. 3 and clearly show that the $N_2O$ break-through occurs only after 300 hours on the 1.1 mm particles.

The break-through stopping capacity is therefore, in this Example 3 according to the invention, more than 22 Scc/g. The results of Tests 1 to 3 are summarized in the comparative table below.

| | | Comparative table | | |
|---|---|---|---|---|
| Test No. | Particle size | Contact time | Break-through time (in hours) | $N_2O$ stopping capacity (Scc/g) |
| 1 | 2.5 mm | 130 sec | 4 | 0.90 |
| 2 | 2.0 mm | 200 sec | 47 | 0.85 |
| 3 | 1.1 mm | 70 sec | >300 | >22 |

It is apparent from the above tests, that reducing the size of the adsorbent particles (in this case silica gel) has the result of improving the adsorbent kinetics and, surprisingly, of purifying the cryogenic fluid (in this case liquid argon) more effectively.

This is because, by reducing the size of the adsorbent particles it is found that the break-through time increases for the same adsorption capacity, that is to say by using adsorbent particles having a size of less than the sizes conventionally used, the production time is extended, this being so even when the contact time between the fluid to be purified and the adsorbent is reduced.

In addition, it may be seen that reducing the size of the adsorbent by a factor of approximately 2 (cr. Example 3) surprisingly and unpredictably causes the stopping capacity to be increased by a factor of about 25, even though the contact time was, moreover, reduced by a factor of 3 (cf. Example 3).

The purification process according to the present invention, based on the use of small-sized (<1.5 mm) adsorbent particles, therefore allows the production phase of a purification cycle to be significantly increased, which in turn makes it possible to reduce the overall costs of the process by decreasing the size of the adsorption reactors, the amount of adsorbent to be used, the frequency of adsorbent regeneration and therefore the energy costs and the amount of regeneration fluid used.

Key to figures

1/3

$N_2O$ input $N_2O$ content (ppm)

$N_2O$ output

Time (hours)

2/3

$N_2O$ input $N_2O$ content (ppm)

$N_2O$ output

Time (hours)

3/3

$N_2O$ input $N_2O$ content (ppm)

$N_2O$ output

Time (hours)

What is claimed is:

1. Process for purifying a cryogenic fluid containing impurities selected from the group consisting of $N_2O$, $C_nH_m$ and $NO_x$, which comprises:
   (a) removing at least some of the impurities contained in the cryogenic fluid to be purified by bringing the cryogenic fluid into contact with particles of at least one adsorbent, said particles having an average size of less than or equal to 1.5 mm; and
   (b) recovering a purified cryogenic fluid which contains less than 100 ppb of said impurities.

2. The process according to claim 1, wherein said particles have an average size of less than or equal to 1.3 mm.

3. The process according to claim 1, wherein said particles have an average size of less than or equal to 1.2 mm.

4. The process according to claim 1, wherein said particles have an average size of approximately 0.8 mm to 1.1 mm.

5. The process according to claim 1, wherein the cryogenic fluid is selected from the group consisting of oxygen, argon, hydrogen, nitrogen and helium.

6. The process according to claim 1, wherein the cryogenic fluid is in the liquid state.

7. The process according to claim 1, wherein the cryogenic fluid is in the gaseous state.

8. The process according to claim 1, wherein at least some of the impurities contained in the cryogenic fluid to be purified are removed by adsorption or by chemisorption on the adsorbent particles.

9. The process according to claim 1, wherein the removal of the impurities is carried out at a temperature below −120° C., and at a pressure of $10^5$ Pa to $3\times10^6$ Pa.

10. The process according to claim 9, wherein the removal of the impurities is carried out at a temperature below −150° C.

11. The process according to claim 1, wherein the contact time between the cryogenic fluid and adsorbent particles is less than or equal to 300 s.

12. The process according to claim 11, wherein the contact time between the cryogenic fluid and adsorbent particles is from 70 to 200 s.

13. The process according to claim 1, wherein the adsorbent particles have at least one of a pore diameter of 0.5 to 2.5 nm, a pore volume of 0.2 to 0.8 ml/g, and a specific surface area of 100 to 1500 $m^2/g$.

14. The process according to claim 1, wherein the adsorbent particles are in bead, extruded, crushed or elliptical form.

15. The process according to claim 1, wherein the adsorbent particles are made of a material selected from the group consisting of silica gel, zeolite, metal oxides and carbon materials.

16. The process according to claim 1, wherein the purified cryogenic fluid contains at most 10 ppb of impurities.

17. The process according to claim 16, wherein the purified cryogenic fluid contains at most 1 ppb of impurities.

* * * * *